US012687863B2

(12) United States Patent
Fleming et al.

(10) Patent No.: US 12,687,863 B2
(45) Date of Patent: Jul. 21, 2026

(54) SYSTEM AND METHOD FOR AUTOMATED PARCEL LOADING AND TRANSPORT

(71) Applicant: FORTNA Systems, Inc., Mt. Washington, KY (US)

(72) Inventors: Michael Thomas Fleming, Waxhaw, NC (US); Robertus Arnoldus Adrianus Schmit, West Bloomfield, MI (US)

(73) Assignee: FORTNA Systems, Inc., Mt. Washington, KY (US)

( * ) Notice: Subject to any disclaimer, the term of this patent is extended or adjusted under 35 U.S.C. 154(b) by 0 days.

(21) Appl. No.: 18/943,085

(22) Filed: Nov. 11, 2024

(65) Prior Publication Data

US 2025/0068186 A1 Feb. 27, 2025

Related U.S. Application Data

(62) Division of application No. 18/621,399, filed on Mar. 29, 2024, now Pat. No. 12,181,897.

(Continued)

(51) Int. Cl.
*B65G 47/46* (2006.01)
*G05D 1/244* (2024.01)
(Continued)

(52) U.S. Cl.
CPC ........... *G05D 1/6987* (2024.01); *B65G 47/46* (2013.01); *G05D 1/244* (2024.01); *G06Q 10/083* (2013.01);
(Continued)

(58) Field of Classification Search
CPC .................................................... G05D 1/6987
See application file for complete search history.

(56) References Cited

U.S. PATENT DOCUMENTS 9,513,627 B1 12/2016 Elazary et al.
9,751,693 B1 * 9/2017 Battles .................. B25J 9/0084
(Continued)

FOREIGN PATENT DOCUMENTS

CN 208261283 U 12/2018
CN 110733813 A 1/2020
(Continued)

OTHER PUBLICATIONS

IP Australia, Examination Report issued in corresponding Application No. 2024247666 dated Oct. 23, 2025.
(Continued)

*Primary Examiner* — Shelley Chen
(74) *Attorney, Agent, or Firm* — Stites & Harbison, PLLC; David W. Nagle, Jr.; Gary N. Stewart

(57) ABSTRACT

A system for loading and transporting parcels includes: a sorter including a plurality of chutes for offloading parcels from the sorter; a plurality of totes; a plurality of self-driving vehicles ("SDVs") configured to transport the plurality of totes between a loading area, an unloading area, and a queue area; and a control subsystem. The loading area includes a plurality of zones, with each zone corresponding to one or more chutes of the sorter. The control subsystem includes a controller, which is operably connected to the SDVs, and which selectively communicates instructions to dispatch SDVs to transport and replace totes in the loading area as they become filled to the predetermined capacity. A method for loading and transporting parcels in a sorting facility including a loading area, an unloading area, and a queue area is also disclosed.

8 Claims, 10 Drawing Sheets

Related U.S. Application Data

(60) Provisional application No. 63/493,477, filed on Mar. 31, 2023.

(51) Int. Cl.

| | | |
|---|---|---|
| *G05D 1/698* | (2024.01) |
| *G06Q 10/083* | (2023.01) |
| *G05D 101/00* | (2024.01) |
| *G05D 105/28* | (2024.01) |
| *G05D 107/70* | (2024.01) |

(52) U.S. Cl.
CPC . *B65G 2203/0241* (2013.01); *G05D 2101/22* (2024.01); *G05D 2105/28* (2024.01); *G05D 2107/70* (2024.01)

(56) References Cited

U.S. PATENT DOCUMENTS

| | | | |
|---|---|---|---|
| 10,450,138 | B1 | 10/2019 | Pikler et al. |
| 10,758,943 | B1 * | 9/2020 | Carpenter ................. B07C 3/08 |
| 11,407,587 | B1 * | 8/2022 | Dwivedi .............. B65G 1/0435 |
| 11,565,881 | B1 * | 1/2023 | Brady .................. G05D 1/0088 |
| 11,977,381 | B1 * | 5/2024 | Patel ......................... B65F 3/02 |
| 12,181,897 | B2 | 12/2024 | Fleming et al. |

| | | | | |
|---|---|---|---|---|
| 2009/0185884 | A1 | 7/2009 | Wurman et al. | |
| 2018/0099751 | A1 * | 4/2018 | Murphy ............... B64D 11/003 | |
| 2020/0086351 | A1 | 3/2020 | Miette et al. | |
| 2021/0047122 | A1 * | 2/2021 | Issing .................. B65G 1/1378 | |
| 2022/0024691 | A1 * | 1/2022 | Serstad ................... B66F 9/063 | |
| 2022/0119210 | A1 * | 4/2022 | Felton .................... G06Q 50/10 | |
| 2022/0236733 | A1 * | 7/2022 | Gupta ................. G01C 21/383 | |
| 2023/0159192 | A1 * | 5/2023 | Gil ......................... B64U 80/40 | 244/137.1 |
| 2023/0202755 | A1 * | 6/2023 | Liu ........................ B65G 1/065 | 700/214 |
| 2024/0002175 | A1 * | 1/2024 | McGushion ........... B65G 67/02 | |
| 2024/0353856 | A1 * | 10/2024 | Oppolzer ................ E02F 3/439 | |

FOREIGN PATENT DOCUMENTS

| | | | |
|---|---|---|---|
| EP | 3842159 | B1 | 1/2022 |
| JP | 2011510888 | A | 4/2011 |
| KR | 20220127387 | A | 9/2022 |
| WO | 2018237105 | A1 | 12/2018 |
| WO | 2020219261 | A1 | 10/2020 |

OTHER PUBLICATIONS

IP Australia, Statement of Grounds and Particulars filed in corresponding Application No. 2024247666 dated Jun. 3, 2026.

* cited by examiner

300

SEND SDV TO
MOVE FILLED TOTE
TO UNLOAD — 302

SEND SDV WITH
RESERVE TOTE
IN ZONE 2 TO REPLACE
FILLED TOTE AND STANDBY — 304

SEND FIRST-IN-LINE
SDV IN QUEUE TO
SECOND PATHWAY OF
ZONE 2 — 306

ADVANCE REMAINING
SDVs IN QUEUE — 308

SYSTEM AND METHOD FOR AUTOMATED PARCEL LOADING AND TRANSPORT

CROSS-REFERENCE TO RELATED APPLICATION

The present application is a divisional of U.S. patent application Ser. No. 18/621,399 filed on Mar. 29, 2024 and claims priority to U.S. Patent Application Ser. No. 63/493,477 filed on Mar. 31, 2023, the entire disclosures of which are incorporated herein by reference.

BACKGROUND OF THE INVENTION

The presently disclosed subject matter relates to a system and method for automated parcel loading and transport.

In a sorting facility for parcels, various parcels are unloaded from trucks or other vehicles at unloading locations, sorted, and then loaded onto trucks or other vehicles at loading locations for delivery to the intended recipients. Thus, within the sorting facility, there is often a complex system of conveyors and equipment that facilitates transport and sorting of the various parcels within the facility.

In some systems of known construction, parcels come off of sorters directly into bags. However, this requires that operators continuously walk the perimeter and gather up the bags full of parcels and set up replacement empty bags. Accordingly, in systems employing sorters configured to offload parcels into a multitude of bags, there can be considerable lag time with respect to both the transport of a filled bag from a particular location alongside a sorter to its intended destination and the placement of an unfilled bag at such location, which can adversely affect overall system throughput and sorting efficiency.

Accordingly, a system and method which reduces the lag time attributable to bag transport and replacement within a sorting system would be both beneficial and desirable.

SUMMARY OF THE INVENTION

The present invention is a system for loading and transporting parcels which provides expeditious replacement and transport of totes filled to a predetermined capacity with parcels.

An exemplary system for loading and transporting parcels made in accordance with the present invention includes: a sorter including a plurality of chutes for offloading parcels from the sorter; a plurality of totes; and a plurality of self-driving vehicles ("SDVs") configured to transport the plurality of totes between a loading area, an unloading area, and a queue area.

Parcels offloaded from the sorter are directed into the loading area for deposit into totes positioned downstream of the chutes of the sorter. The loading area includes a plurality of zones, with each zone corresponding to one or more chutes of the sorter. Totes filled in the loading area to a predetermined capacity are transported to the unloading area by the SDVs, where they are emptied. The queue area provides an area in which the SDVs can be stationed prior to being dispatched to the loading area. The system further includes a control subsystem with a controller, which is operably connected to the SDVs, and which selectively communicates instructions to dispatch SDVs to transport and replace totes in the loading area as they become filled to the predetermined capacity.

When the system is in use, and one or more totes in the loading area are filled to the predetermined capacity, the controller dispatches one or more first select SDVs located in the loading area to transport the one or more filled totes to the unloading area. To replace the filled totes transported to the unloading area, the controller dispatches one or more second select SDVs to deposit one or more empty totes in the loading area. Once the one or more empty totes are deposited in the loading area, the second select SDVs standby in an area of the loading area previously occupied by one of the first select SDVs prior to being dispatched to the unloading area. Prior to being dispatched to deposit an empty tote, each of the one or more second select SDVs may be located in the loading area or the queue area.

In some embodiments, when the system is in use, the controller may dispatch a SDV in the queue area to advance to a first-in-line position subsequent to another SDV in the queue area being dispatched from the first-in-line position to the loading area.

In some embodiments, each respective zone of the loading area may include a first pathway along which a SDV can position a tote transported thereby to receive parcels offloaded from the one or more chutes to which the zone corresponds, a second pathway positioned adjacent to the first pathway, and a third pathway positioned adjacent to the first pathway or the second pathway. In some embodiments, the first pathway, the second pathway, and the third pathway of each respective zone is provided with one or more indicators detectable by the SDVs. In some embodiments, the second pathway of each respective zone is positioned beneath, at least in part, the one or more chutes corresponding to the zone, and the third pathway of each zone is positioned adjacent to the first pathway of the zone.

In some embodiments, when the system is in use, the controller may dispatch a SDV located along the first pathway of a particular zone to engage a tote in the particular zone that is filled to the predetermined capacity, travel to the third pathway of the particular zone, and then travel toward the unloading area. In some embodiments, when the system is in use, the controller may dispatch either a SDV located in the first-in-line position in the queue area or a SDV located along the second pathway of the particular zone to travel to the first pathway of the particular zone.

In some embodiments, when the system is in use, the controller may dispatch a SDV located along the first pathway of a particular zone to engage a tote in the particular zone that is filled to the predetermined capacity, travel to the third pathway of the particular zone, and then travel toward the unloading area. In some embodiments, when the system is in use, the controller may dispatch a SDV located along the second pathway of the particular zone to travel from the second pathway of the particular zone to the first pathway of the particular zone. In some embodiments, when the system is in use, the controller may dispatch a SDV located in the first-in-line position in the queue area to travel from the queue area to the second pathway of the particular zone.

In some embodiments, when the system is in use, the controller may dispatch a SDV located along the first pathway of a first zone to engage a tote in the first zone that is filled to the predetermined capacity, travel to the third pathway of the first zone, and then travel toward the unloading area. In some embodiments, when the system is in use, the controller may dispatch a SDV located along the second pathway of the first zone to travel from the second pathway of the first zone to the first pathway of the first zone. In some embodiments, when the system is in use, the controller may dispatch a SDV located along a second pathway of a second zone positioned adjacent to the first zone to travel from the second pathway of the second zone to the second pathway of the first zone. In some embodiments, when the system is in use, the controller may dispatch a SDV located in the first-in-line position of the queue area to travel from the queue area to the second pathway of the second zone.

In some embodiments, the controller determines when a tote within a zone has been filled to the predetermined capacity based, at least in part, on readings obtained from one or more sensors operably connected to the controller and configured to obtain readings indicative of a capacity to which the totes positioned downstream of the chutes of the sorter have been filled.

An exemplary method for loading and transporting parcels in a sorting facility including a loading area, an unloading area, and a queue area is also disclosed.

DETAILED DESCRIPTION OF THE INVENTION

The present invention is a system for loading and transporting parcels which provides expeditious replacement and transport of totes filled to a predetermined capacity with parcels.

Figure 1:
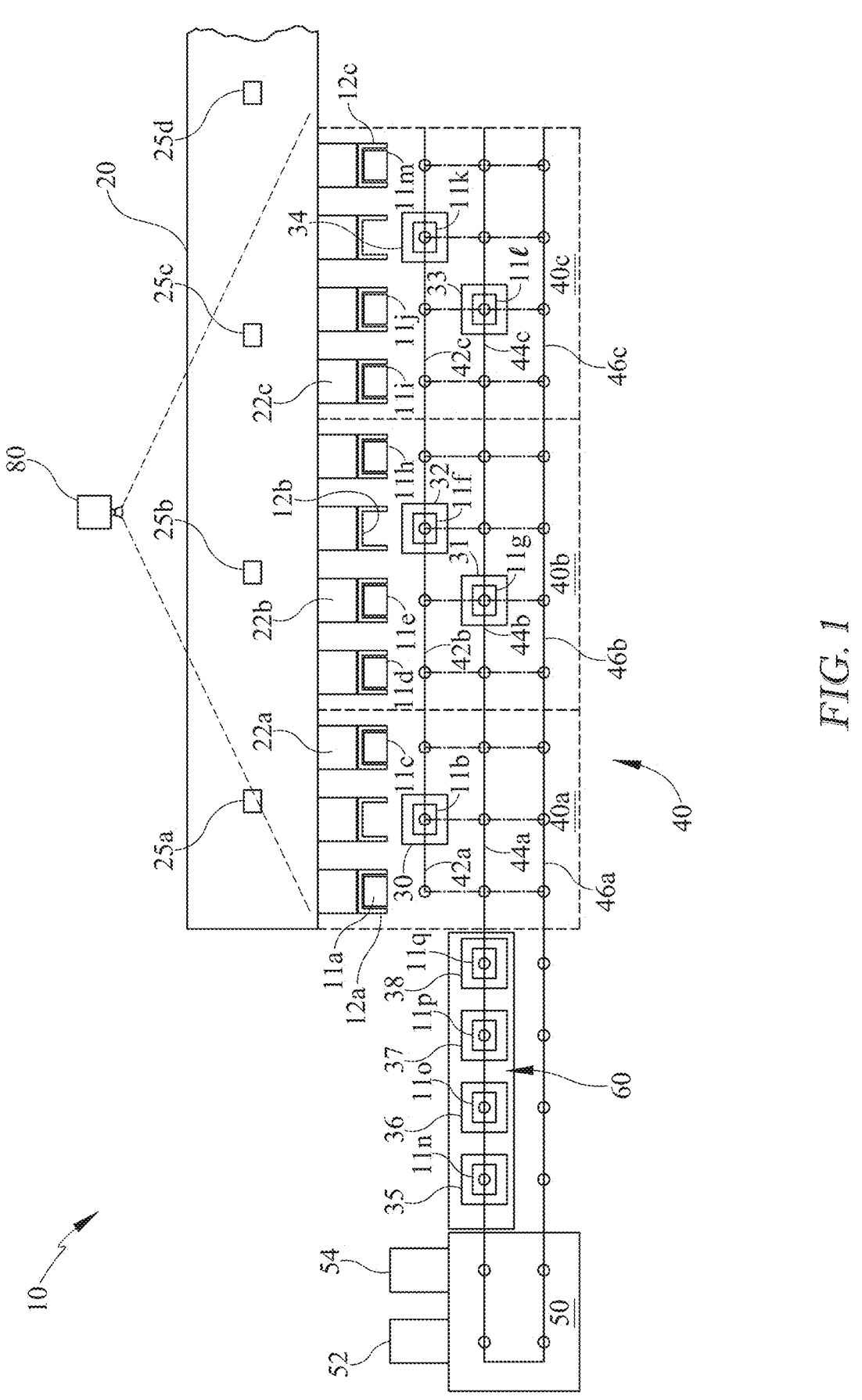
FIG. 1 is a schematic view of an exemplary system for loading and transporting parcels made in accordance with the present invention.
Figure 2:
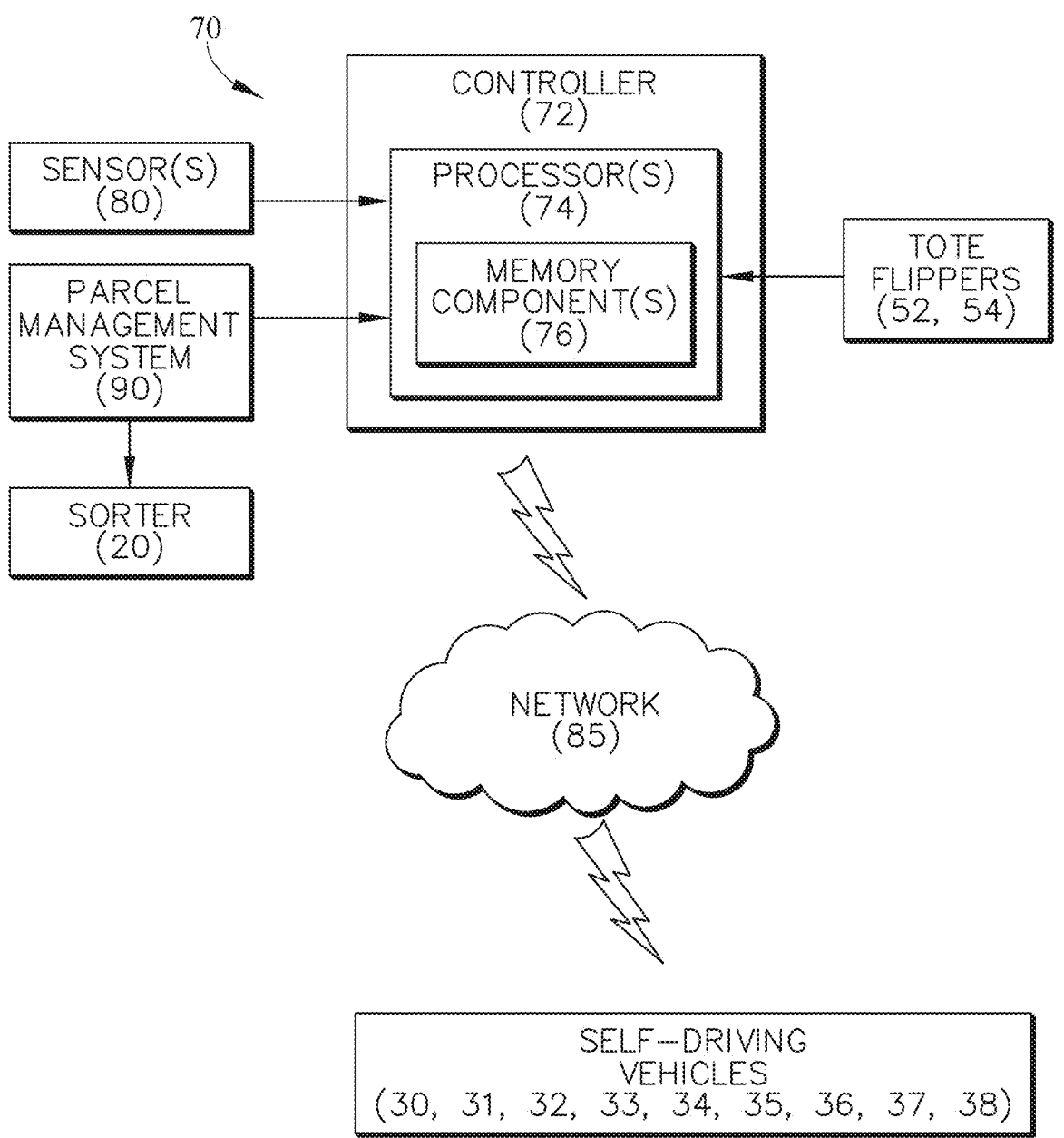
FIG. 2 is a block diagram of a control subsystem of the exemplary system for loading and transporting parcels of FIG. 1.

Referring first to FIGS. 1 and 2, an exemplary system for loading and transporting parcels (or system) 10 generally includes: a sorter 20 including a plurality of chutes (including those labeled with reference numbers 22a, 22b, 22c) for offloading parcels 25a, 25b, 25c, 25d from the sorter 20; a plurality of self-driving vehicles ("SDVs") 30, 31, 32, 33, 34, 35, 36, 37, 38 configured to transport a plurality of totes 11a, 11b, 11c, 11d, 11e, 11f, 11g, 11h, 11i, 11j, 11k, 11l, 11m, 11n, 11o, 11p, 11q between: a loading area 40 into which parcels 25a, 25b, 25c, 25d offloaded from the sorter 20 are directed; an unloading area 50 in which totes 11a, 11b, 11c, 11d, 11e, 11f, 11g, 11h, 11i, 11j, 11k, 11l, 11m, 11n, 11o, 11p, 11q filled to a predetermined capacity are emptied; and a queue area 60 in which SDVs 30, 31, 32, 33, 34, 35, 36, 37, 38 can be stationed prior to being dispatched to the loading area 40. As shown in FIG. 2, in this exemplary embodiment, the system 10 further includes a control subsystem 70 with a controller 72 that selectively dispatches the plurality of SDVs 30, 31, 32, 33, 34, 35, 36, 37, 38 in a manner which provides expeditious replacement and transport of the totes 11a, 11b, 11c, 11d, 11e, 11f, 11g, 11h, 11i, 11j, 11k, 11l, 11m, 11n, 11o, 11p, 11q when each is filled to the predetermined capacity, as further described below.

It is important to recognize that, in the discussion that follows and in the claims of the present application, a "self-driving vehicle" means any autonomous vehicle whose movement is not dependent upon human operation, and which is capable of transporting totes or similar articles for holding parcels in the manner specified within the present disclosure. For instance, in some embodiments, the SDVs 30, 31, 32, 33, 34, 35, 36, 37, 38 may be in the form of automated guided vehicles ("AGVs"), while, in other embodiments, the SDVs 30, 31, 32, 33, 34, 35, 36, 37, 38 may be in the form of autonomous mobile robots ("AMRs"). For instance, suitable self-driving vehicles which may be utilized in the exemplary system 10 include the P40 and P40PLD mobile robots manufactured by Geek+ of Beijing, China.

It is also important to recognize that, in the discussion that follows and in the claims of the present application, the term "parcel" is not intended to be limiting and can include any article, item, or object that may be transported, offloaded, and/or received in the manner specified within the present disclosure.

Additionally, it is important to recognize that, in the discussion that follows and in the claims of the present application, the term "tote" is understood to mean a receptacle which can be transported by a SDV 30, 31, 32, 33, 34, 35, 36, 37, 38 in the manner described herein, and which can receive one or more parcels 25a, 25b, 25c, 25d offloaded from the chutes 22a, 22b, 22c of the sorter 20. As such, the totes 11a, 11b, 11c, 11d, 11e, 11f, 11g, 11h, 11i, 11j, 11k, 11l, 11m, 11n, 11o, 11p, 11q of the system 10 disclosed herein are not necessarily limited to a particular material of construction, shape, or dimension. For instance, in some embodiments and implementations, some or all of the totes 11a, 11b, 11c, 11d, 11e, 11f, 11g, 11h, 11i, 11j, 11k, 11l, 11m, 11n, 11o, 11p, 11q may be in the form of a substantially rigid box, while, in other embodiments and implementations, some or all of the totes 11a, 11b, 11c, 11d, 11e, 11f, 11g, 11h, 11i, 11j, 11k, 11l, 11m, 11n, 11o, 11p, 11q may be in the form of a flexible or semi-flexible bag.

Furthermore, it is important to recognize that, in the discussion that follows and in the claims of the present application, where reference is made to the controller 72 "dispatching" a SDV, such reference corresponds to one or more processors of the controller 72 communicating instructions which cause the SDV to move in the described manner.

Referring now again to FIGS. 1 and 2, when the system 10 is in use, each respective parcel 25a, 25b, 25c, 25d loaded onto the sorter 20 is directed to one of the plurality of chutes 22a, 22b, 22c based on the intended destination for the parcel. Typically, a parcel management system 90 configured to read and discern identifying indicia provided on parcels prior to the parcels 25a, 25b, 25c, 25d reaching the chutes 22a, 22b, 22c of the sorter 20 will be utilized to determine the intended destination for each respective parcel loaded onto the sorter 20. In this regard, the parcel management system 90 is operably connected to the sorter 20, such that the sorter 20 directs individual parcels to individual chutes 22a, 22b, 22c based on the readings obtained by or instructions (signals) received from the parcel management system 90. Parcel management systems suitable for performing the operations of the parcel management system 90 described herein are well-known in the art. For example, sorters suitable for performing the operations of the sorter 20 described herein are known in the art and include, but are not necessarily limited to, loop- and line-based sorters.

Referring now specifically to FIG. 1, parcels 25a, 25b, 25c, 25d offloaded from the sorter 20 via the plurality of chutes 22a, 22b, 22c are directed into the loading area 40, which, in this exemplary embodiment and implementation, is divided into three separate zones: a first zone 40a positioned adjacent to the queue area 60; a second zone 40b positioned adjacent to the first zone 40a; and a third zone 40c positioned adjacent to the second zone 40b. Each respective zone 40a, 40b, 40c is associated with a destination to which parcels 25a, 25b, 25c, 25d offloaded into the zone 40a, 40b, 40c are ultimately intended to be delivered. Further, as shown, each respective zone 40a, 40b, 40c also corresponds to a set of one or more chutes of the plurality of chutes 22a, 22b, 22c. In this exemplary embodiment and implementation, each respective zone 40a, 40b, 40c corresponds to multiple chutes. Specifically, in this implementation, the first zone 40a corresponds to three separate chutes, while the second zone 40b and the third zone 40c each correspond to four separate chutes. For clarity in illustration in FIG. 1, only one chute 22a, 22b, 22c for each zone 40a, 40b, 40c has been provided with a reference numeral. Of course, alternative embodiments and implementations are also contemplated in which one or more of the zones 40a, 40b, 40c correspond to a single chute, two chutes, or more than four chutes. It should also be appreciated that some or all of the system operations described herein which contribute to the reduction in lag time associated with the manual transfer of containers filled with parcels and/or facilitate the continuous offloading of parcels 25a, 25b, 25c, 25d from the sorter 20 may find utility in sorting environments with zone configurations different than that illustrated in FIG. 1. Accordingly, alternative embodiments in which the system 10 includes more than three zones 40a, 40b, 40c, as well as alternative embodiments in which the system 10 includes less than three zones 40a, 40b, 40c, are also contemplated herein.

Referring still to FIG. 1, in this exemplary embodiment and implementation, each respective zone 40a, 40b, 40c includes: a first lane (or first pathway) 42a, 42b, 42c; a second lane (or second pathway) 44a, 44b, 44c; and a third lane (or third pathway) 46a, 46b,46c. The first pathway 42a, 42b, 42c of each zone 40a, 40b, 40c is positioned adjacent to the one or more chutes 22a, 22b, 22c corresponding to the zone 40a, 40b, 40c. When the system 10 is in use, the SDVs 30, 31, 32, 33, 34, 35, 36, 37, 38 can travel along the first pathway 42a, 42b, 42c of a zone 40a, 40b, 40c (parallel to the sorter 20) to either position a tote 11a, 11b, 11c, 11d, 11e, 11f, 11g, 11h, 11i, 11j, 11k, 11l, 11m, 11n, 11o, 11p, 11q carried by a SDV 30, 31, 32, 33, 34, 35, 36, 37, 38 to receive parcels offloaded by the chutes 22a, 22b, 22c corresponding to the zone 40a, 40b, 40c, or to engage a tote 11a, 11b, 11c, 11d, 11e, 11f, 11g, 11h, 11i, 11j, 11k, 11l, 11m, 11n, 11o, 11p, 11q for transfer to the unloading area 50.

Referring still to FIG. 1, in this exemplary embodiment, the second pathway 44a, 44b, 44c of each zone 40a, 40b, 40c is positioned adjacent and parallel to the first pathway 42a, 42b, 42c of the respective zone 40a, 40b, 40c and provides a pathway along which the SDVs 30, 31, 32, 33, 34, 35, 36, 37, 38 can travel from one zone 40a, 40b, 40c of the loading area 40 to another zone 40a, 40b, 40c of the loading area 40. As shown, in this exemplary embodiment and implementation, the second pathway 44a of the first zone 40a is the portion of the loading area 40 into which SDVs 30, 31, 32, 33, 34,35, 36, 37, 38 dispatched from the queue area 60 to the loading area 40 initially enter. Of course, the queue area 60 may, in alternative embodiments, be oriented relative to the loading area 40 so that SDVs 30, 31, 31, 33, 34, 35, 36, 37, 38 dispatched from the queue area 60 first enter the loading area 40 along another pathway of the first zone 40a.

Referring still to FIG. 1, in this exemplary embodiment, the third pathway 46a, 46b, 46c of each zone 40a, 40b, 40c is positioned adjacent and parallel to the second pathway 44a, 44b, 44c of the respective zone 40a, 40b, 40c. When the system 10 is in use, the SDVs 30, 31, 32, 33, 34, 35, 36, 37, 38 can travel along the third pathway 46a, 46b, 46c to transport a tote 11a, 11b, 11c, 11d, 11e, 11f, 11g, 11h, 11i, 11j, 11k, 11l, 11m, 11n, 11o, 11p, 11q filled to the predetermined capacity toward the unloading area 50. As reflected in the discussion below with reference to FIG. 10, the positioning and/or orientation of the first pathway 42a, 42b, 42c, the second pathway 44a, 44b, 44c, and the third pathway 46a, 46b, 46c of each zone 40a, 40b, 40c relative to each other can, however, be modified without departing from the spirit and scope of the present disclosure. As shown, in this exemplary embodiment, the first pathway 42a, 42b, 42c, the second pathway 44a, 44b,44c, and the third pathway 46a, 46b, 46c of each zone 40a, 40b, 40c are horizontally positioned relative to the direction in which parcels 25a, 25b, 25c, 25d are offloaded from the one or more chutes 22a, 22b, 22c corresponding to the zone 40a, 40b, 40c and, as noted above, parallel to each other.

Figure 10:
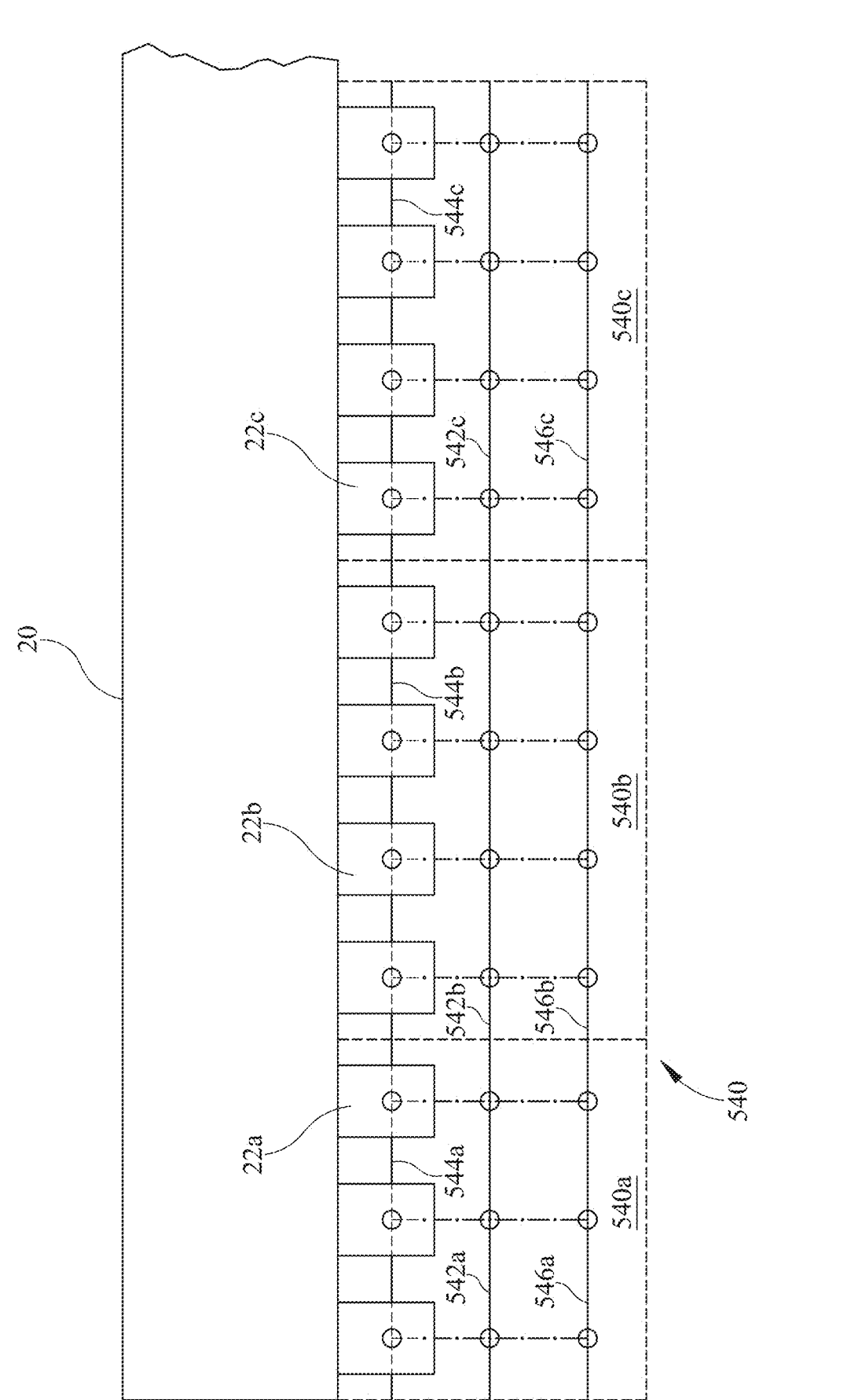
FIG. 10 is a schematic view of an alternative loading area arrangement which may be utilized in the exemplary system for loading and transporting parcels of FIG. 1.

Referring now to FIG. 10, an alternative loading area 540 which may be utilized in place of the loading area 40 arrangement described above with reference to FIG. 1 is shown. Like the loading area 40 described above with reference to FIG. 1, the first pathway 542a, 542b, 542c of each respective zone 540a, 540b, 540c is also positioned adjacent to the one or more chutes 22a, 22b, 22c of the zone 540a, 540b, 540c. Unlike the loading area 40 described above with reference to FIG. 1, however, the second pathway of 544a, 544b, 544c of each respective zone 540a, 540b, 540c is positioned beneath the one or more chutes 22a, 22b, 22c of the sorter 20 corresponding to the zone 540a, 540b, 540c so that the SDVs 30, 31, 32, 33, 34, 35, 36, 37, 38 can be positioned under the one or more chutes 22a, 22b, 22c corresponding to the zone 540a, 540b 540c while positioned in the second pathway 544a, 544b, 544c. As shown, in this loading area 540 arrangement, the third pathway 546a, 546b, 546c of each respective zone 540a, 540b, 540c is positioned adjacent to the first pathway 542a, 542b, 542c (instead of the second pathway as in the loading area 40 arrangement of FIG. 1). In some sorting applications, the foregoing pathway arrangement of FIG. 10 may be preferred as it may serve to provide for faster tote exchange (i.e., minimize the time between a filled tote being removed and replaced with an empty tote) than the pathway arrangement of FIG. 1. It should be appreciated, however, that the SDV movement routines described below can be applied to system embodiments employing either the loading area 40 arrangement of FIG. 1 or the loading area 540 arrangement of FIG. 10.

Referring now again to FIG. 1, in this exemplary embodiment, each SDV 30, 31, 32, 33, 34, 35, 36, 37, 38 is a center drive inertia AGV, and the first pathway 42a, 42b, 42c, the second pathway 44a, 44b, 44c, and the third pathway 46a, 46b, 46c of each respective zone 40a, 40b, 40c are provided with optical labels (indicators) which demarcate the respective pathways and are detectable by the SDVs 30, 31, 32, 33, 34, 35, 36, 37, 38 for location confirmation. Such optical labels are known in the art and help to inform and/or guide the SDVs 30, 31, 32, 33, 34, 35, 36, 37, 38 to desired positions within the first zone 40a, the second zone 40b, and the third zone 40c. Of course, other types of indicators suitable for fully or partially demarcating the first pathway 42a, 42b, 42c, the second pathway 44a, 44b, 44c, and the third pathway 46a, 46b, 46c of each respective zone 40a, 40b, 40c and detectable by the SDVs 30, 32, 33, 34, 35, 36, 37, 38 as to inform the position thereof may also be utilized without departing from the spirit and scope of the present disclosure. For instance, in an alternative embodiment, the first pathway 42a, 42b, 42c, the second pathway 44a, 44b, 44c, and the third pathway 46a, 46b, 46c of each respective zone 40a, 40b, 40c may be fully or partially demarcated by one or more strips of magnetic tape detectable and utilized by the SDVs 30, 31, 32, 33, 34, 35, 36, 37, 38 to confirm their location and/or inform their movement within the sorting area 40. To aid the SDVs 30, 31, 32, 33, 34, 35, 36, 37, 38 in navigating between the first pathway 42a, 42b, 42c, the second pathway 44a, 44b, 44c, and the third pathway 46a, 46b, 46c, of each respective zone 40a, 40b, 40c, optical labels detectable by the SDVs 30, 31, 32, 33, 34, 35, 36, 37, 38, which, in FIG. 1, are indicated in dot-dash lines, are provided between the adjacently positioned pathways of each zone 40a, 40b, 40c. These optical labels may also be characterized as "interconnecting indicators." In FIG. 1, the circles (or markers) located within each zone 40a, 40b, 40c and bisected by the first pathway 42a, 42b, 42c, the second pathway 44a, 44b, 44c, or the third pathway 46a, 46b, 46c of the zone 40a, 40b, 40c are meant to illustrate positions which the SDVs 30, 31, 32, 33, 34, 35, 36, 37, 38 may temporarily be positioned and/or which the SDVs 30, 31, 32, 33, 34, 35, 36, 37, 38 may first enter into one pathway of a zone from another pathway of the zone. For sake of clarity in FIG. 1, reference numerals for both the markers and interconnecting indicators have been omitted. As shown, in this exemplary embodiment, each interconnecting indicator is vertically oriented and extends between a first marker along one pathway within a zone 40a, 40b, 40c and a second marker along another pathway of the zone. Of course, the orientation and/or points to which the interconnecting indicators interconnect two pathways of a zone 40a, 40b, 40c can be modified to better accommodate different sorting applications and/or environments without departing from the spirit and scope of the present disclosure.

Referring now again to FIG. 2, the SDVs 30, 31, 32, 33, 34, 35, 36, 37, 38 of the system 10 are selectively dispatched between the loading area 40, the unloading area 50, and the queue area 60 by the control subsystem 70. The control subsystem 70 thus includes a controller 72 that is operably connected to each SDV 30, 31, 32, 33, 34, 35, 36, 37, 38, such that the controller 72 can selectively communicate instructions (signals) to regulate movement of the SDVs 30, 31, 32, 33, 34, 35, 36, 37, 38 in the system 10 in the manner described below. To this end, the controller 72 includes a processor 74 for executing instructions (routines) stored in a memory component 76 to carry out the operations of the controller 72 described herein. Although the processor 74 and the memory component 76 are primarily referred to in singular form within the present description for simplicity in explanation, such reference is not intended to limit the control subsystem 70 to a construction in which the controller 72 includes only a single processor and/or memory component. Rather, embodiments in which the controller 72 includes only a single processor and/or memory component, as well as embodiments in which the controller 72 includes multiple processors and/or memory components, are contemplated herein. In embodiments in which multiple processors and memory components are utilized, the multiple processors and memory components may be distributed about different locations or centralized in a single location. As shown, in this exemplary embodiment, the controller 72 is wirelessly connected to each SDV 30, 31, 32, 33, 34, 35, 36, 37, 38 via a network 85 using known interfaces, protocols, and technology standards.

As further described below, and referring now again to FIGS. 1 and 2, the controller 72 is configured to selectively dispatch SDVs 30, 31, 32, 33, 34, 35, 36, 37, 38 in response to a tote within a respective zone 40a, 40b, 40c of the loading area 40 becoming filled with parcels 25a, 25b, 25c, 25d to a predetermined capacity. In this exemplary embodiment, the control subsystem 70 further includes one or more sensors 80, and the controller 72 is configured to determine when a tote within a respective zone 40a, 40b, 40c of the loading area 40 is filled based on the readings obtained by the one or more sensors 80. The one or more sensors 80 are thus configured to obtain readings indicative of whether totes within the system 10 have been filled to predetermined capacity. The one or more sensors 80 are operably connected to the controller 72 via a wired or wireless connection, such that the readings obtained by the one or more sensors 80 are transmitted to the processor 74 of the controller 72 for subsequent processing. The one or more sensors 80 may be selectively activated to obtain readings in response to instructions (or signals) communicated from the controller 72 or obtain readings substantially continuously. As shown in FIG. 1, in this exemplary embodiment, the one or more sensors 80 is in the form of a camera with a field of view (as indicated by the broken lines extending from the camera in FIG. 1) encompassing, and configured to acquire of, the totes positioned to receive parcels 25a, 25b, 25c, 25d offloaded from the chutes 22a, 22b, 22c of the sorter 20, which, in the example shown in FIG. 1, are totes 11a, 11c, 11d, 11e, 11h, 11i, 11j, 11m. Although the second positioned chute of the first zone 40a and the third positioned chutes of the second zone 40b and the third zone 40c do not have a tote associated therewith at the time reflected in FIG. 1, it should be appreciated that the field of view of the camera encompasses, and the camera is configured to capture one or more images of, totes positioned to receive parcels 25a, 25b, 25c, 25d offloaded from such chutes.

Referring now again specifically to FIG. 1, as shown, in this exemplary embodiment and implementation, the system 10 includes a plurality of racks 12a, 12b, 12c which maintain totes in a suspended position above a ground surface and downstream of the respective chutes 22a, 22b, 22c of the sorter 20. For sake of clarity in FIG. 1, only three of the racks 12a, 12b, 12c are provided with reference numerals. It is appreciated, however, that the number of racks 12a, 12b, 12c in this exemplary embodiment corresponds to the number of chutes 22*a*, 22*b*, 22*c*, and that each respective rack 12*a*, 12*b*, 12*c* is positioned downstream of one of the chutes 22*a*, 22*b*, 22*c*. Alternative embodiments and implementations in which the SDVs 30, 31, 32, 32, 33, 34, 35, 36, 37, 38 are configured to lift totes directly from and deposit totes directly onto a ground surface or other tote-supporting structure are, however, also contemplated herein.

Referring still to FIG. 1, the images captured by the one or more sensors 80 (e.g., camera) are processed by the processor 74 of the controller 72 to determine which, if any, of the totes should be transported to the unloading area 50 at a given time and thus whether to communicate instructions to select SDVs 30, 31, 32, 33, 34, 35, 36, 37, 38 in the manner described below. In some embodiments, the one or more sensors 80 may include multiple cameras. In this regard, embodiments in which the number of cameras correspond to the number of zones 40*a*, 40*b*, 40*c* within the loading area 40, as well as embodiments in which the number of cameras corresponds to the number of chutes 22*a*, 22*b*, 22*c* of the sorter 20, are contemplated herein. Suitable cameras for use in the control subsystem 70 include three-dimensional image sensors manufactured and distributed by ifm Effector Inc. of Malvern, Pennsylvania.

In some alternative embodiments and implementations, the one or more sensors 80 may additionally or alternatively include other sensors configured to acquire readings indicative to the extent to which the totes 11*a*, 11*b*, 11*c*, 11*d*, 11*e*, 11*f*, 11*g*, 11*h*, 11*i*, 11*j*, 11*k*, 11*l*, 11*m*, 11*n*, 11*o*, 11*p*, 11*q* in the system have been volumetrically filled and/or the weight exhibited by the totes 11*a*, 11*b*, 11*c*, 11*d*, 11*e*, 11*f*, 11*g*, 11*h*, 11*i*, 11*j*, 11*k*, 11*l*, 11*m*, 11*n*, 11*o*, 11*p*, 11*q*. For instance, in one alternative embodiment, the one or more sensors 80 may include a weight sensor for each tote 11*a*, 11*b*, 11*c*, 11*d*, 11*e*, 11*f*, 11*g*, 11*h*, 11*i*, 11*j*, 11*k*, 11*l*, 11*m*, 11*n*, 11*o*, 11*p*, 11*q*, where each weight sensor is operably connected to the controller 72 and is configured to acquire readings indicative of the weight associated with the tote 11*a*, 11*b*, 11*c*, 11*d*, 11*e*, 11*f*, 11*g*, 11*h*, 11*i*, 11*j*, 11*k*, 11*l*, 11*m*, 11*n*, 11*o*, 11*p*, 11*q* with which it is associated. In such embodiment, the controller 72 may determine whether totes located in the first pathway 42*a*, 42*b*, 42*c* of each respective zone 40*a*, 40*b*, 40*c* are filled to the predetermined capacity based, at least in part, on the readings provided by the weight sensors associated with such totes. In some alternative embodiments and implementations, the controller 72 may determine when the totes 11*a*, 11*b*, 11*c*, 11*d*, 11*e*, 11*f*, 11*g*, 11*h*, 11*i*, 11*j*, 11*k*, 11*l*, 11*m*, 11*n*, 11*o*, 11*p*, 11*q* are filled to the predetermined capacity based on predetermined information received from the parcel management system 90 operably connected to the controller 72.

To process the instructions communicated by the controller 72, or instructions communicated by an intermediate device within the network 85 corresponding to the instructions initially communicated by the controller 72, the SDVs 30, 31, 32, 33, 34, 35, 36, 37, 38 will typically include one or more onboard processors (not shown) which process the received instructions and subsequently communicate instructions (signals) which cause the SDVs 30, 31, 32, 33, 34, 35, 36, 37, 38 to move in a manner corresponding to the received instructions. In some embodiments, the SDVs 30, 32, 34, 35, 36, 37, 38 may also include global positioning system (GPS) tracking chips (not shown) and be operably connected to the controller 72, such that data from the GPS tracking chips can be transmitted to the controller 72 for subsequent processing to determine the location of the SDVs 30, 31, 32, 33, 34, 35, 36, 37, 38 at any given time. In some embodiments, the controller 72 may communicate instructions to dispatch the SDVs 30, 31, 32, 33, 34, 35, 36, 37, 38 in the system based, in part, on data transmitted by the GPS tracking chips of the SDVs 30, 31, 32, 33, 34, 35, 36, 37, 38.

Figure 3:
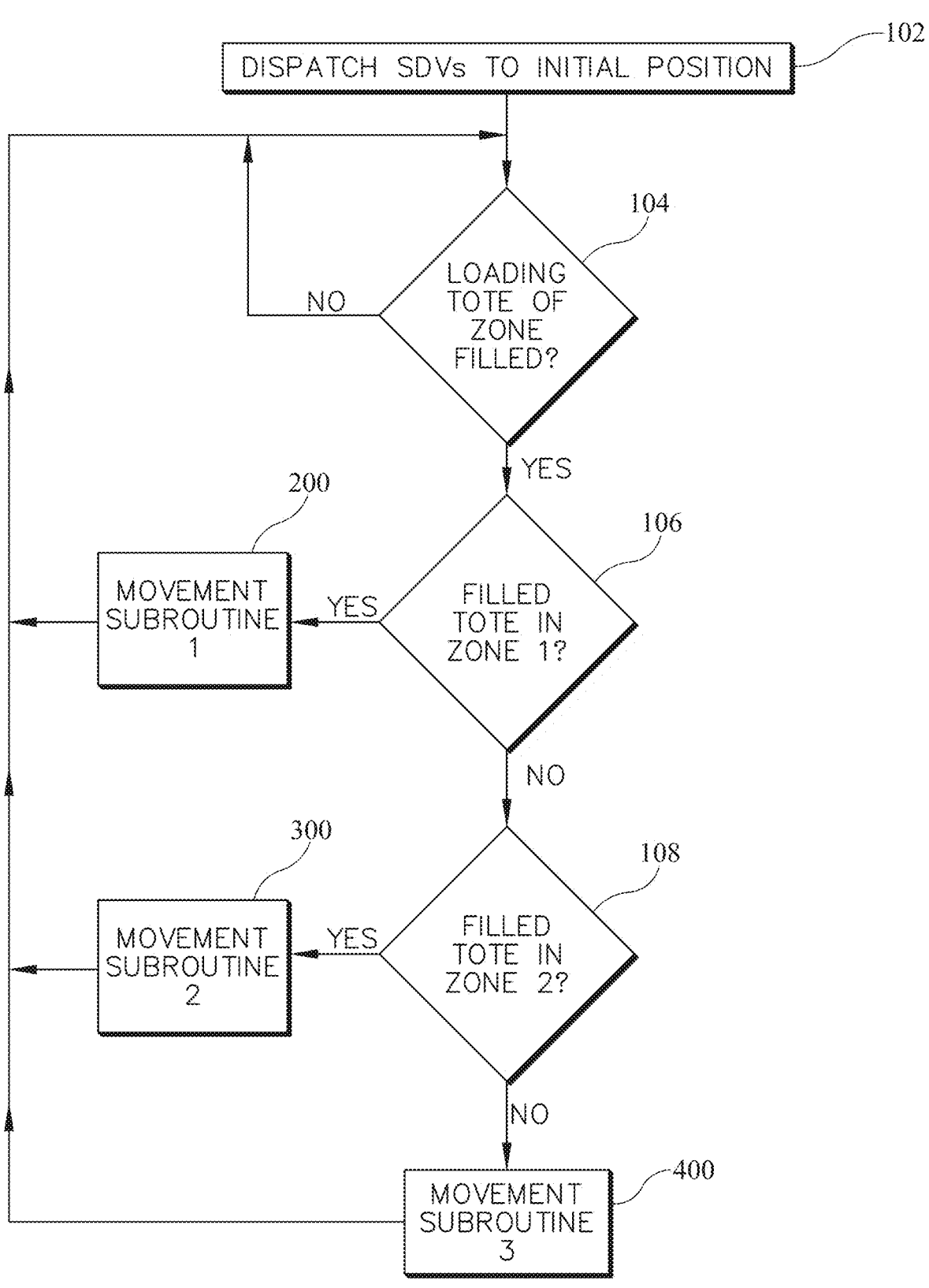
FIG. 3 is a flow diagram of an exemplary routine for dispatching self-driving vehicles in the exemplary system for loading and transporting parcels of FIG. 1.
Figure 4:
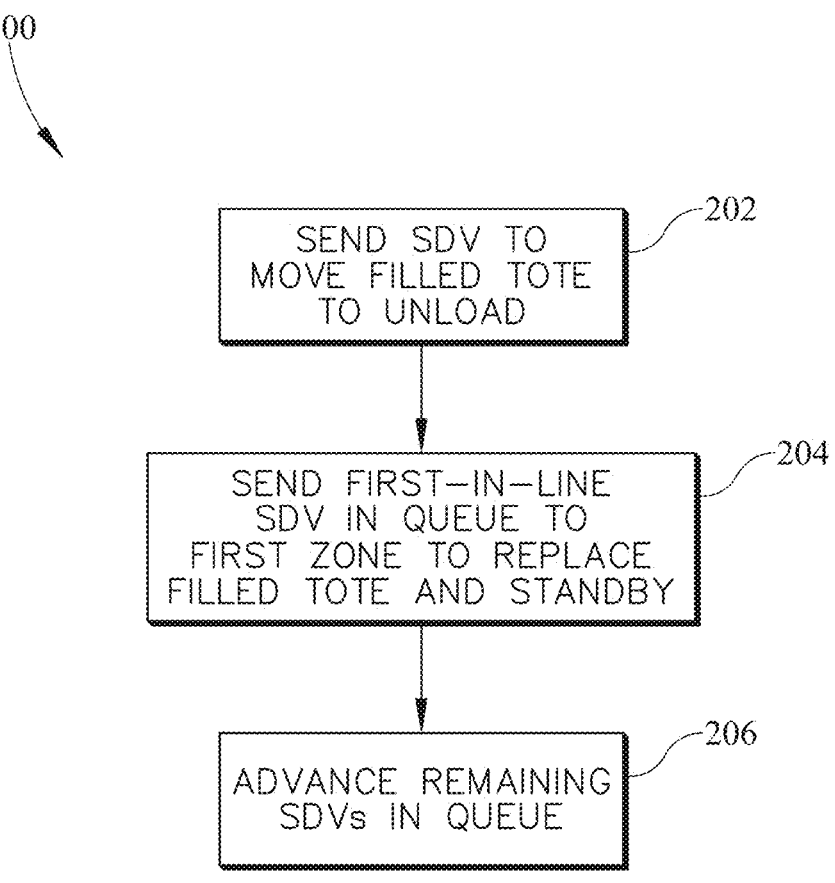
FIG. 4 is a flow diagram of a first exemplary self-driving vehicle subroutine for dispatching self-driving vehicles in the exemplary system for loading and transporting parcels of FIG. 1.
Figure 5:
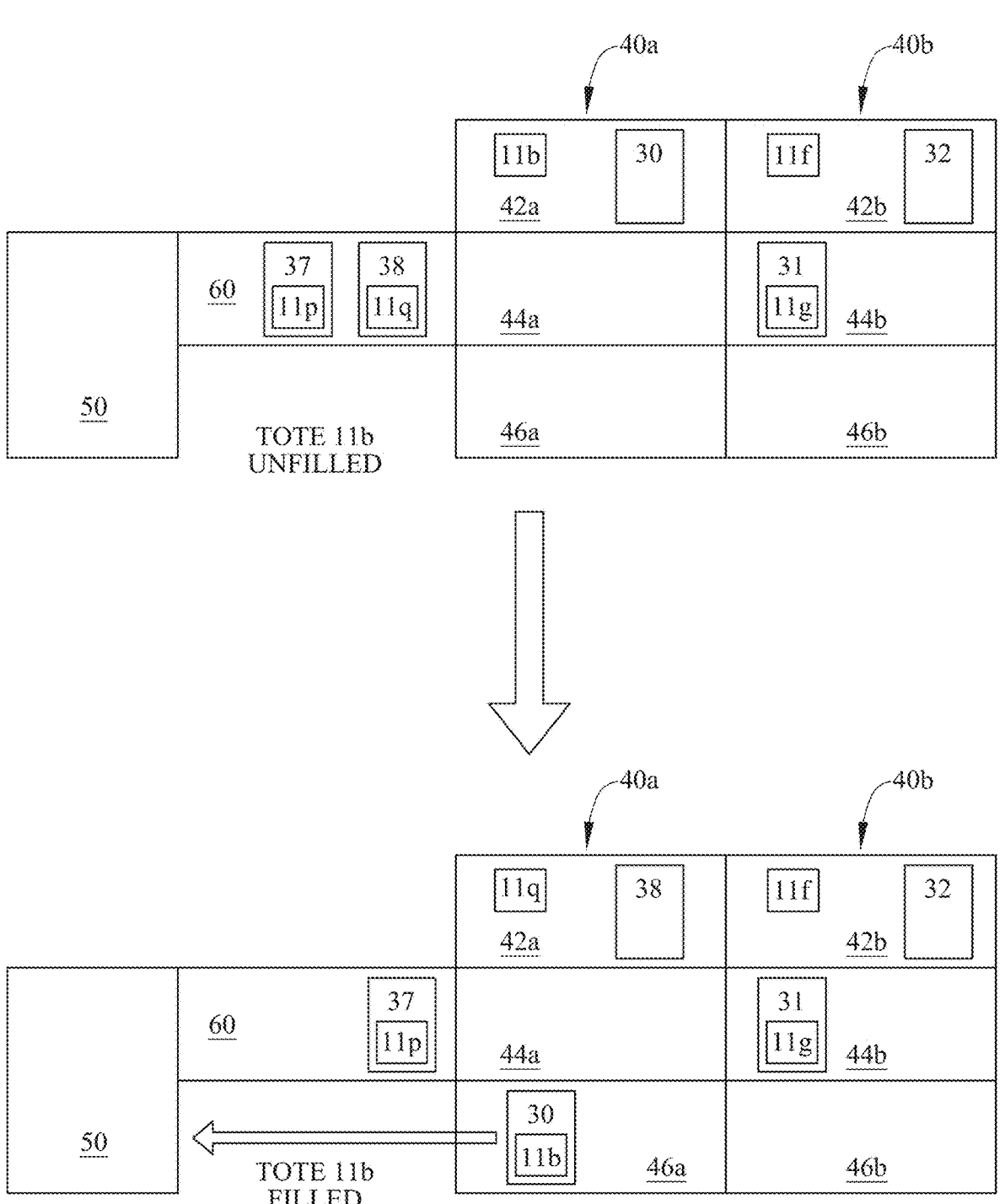
FIG. 5 is a schematic diagram showing an example of self-driving vehicles within the exemplary system for loading and transporting parcels of FIG. 1, with the self-driving vehicles moving in accordance with the first exemplary self-driving vehicle subroutine of FIG. 4.
Figure 6:
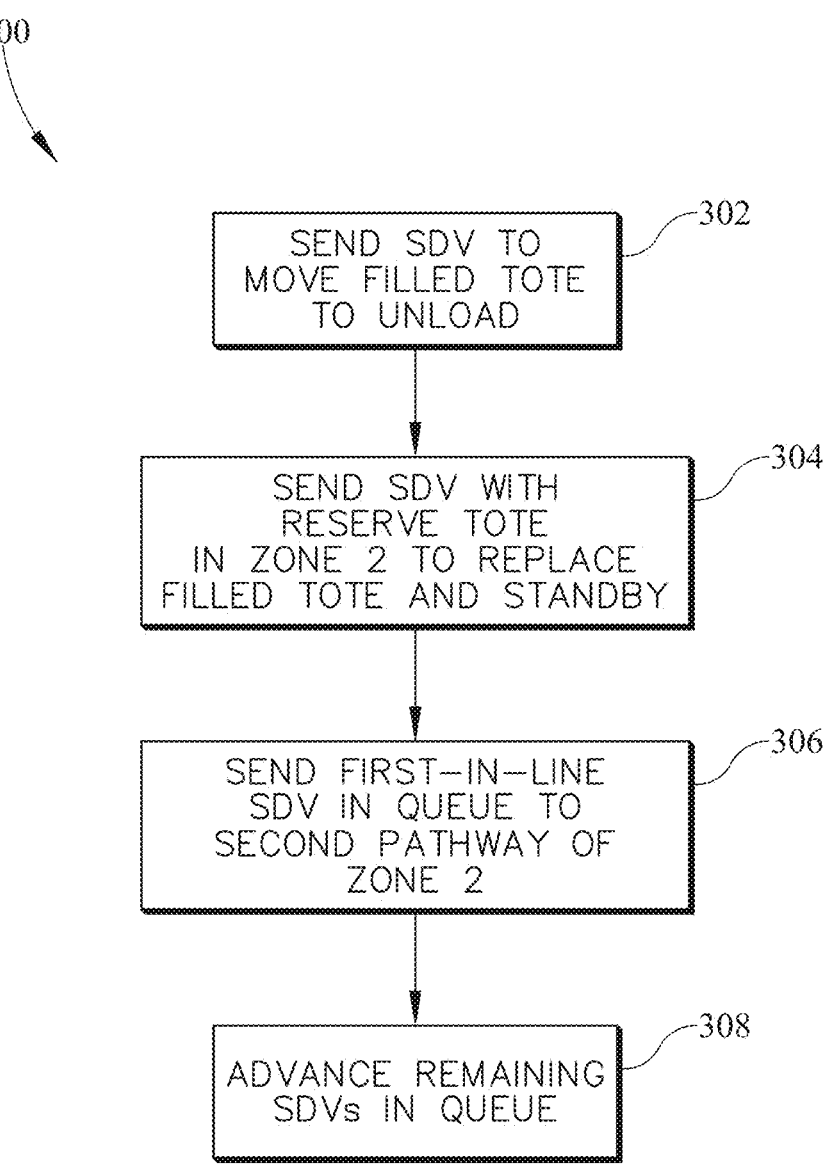
FIG. 6 is a flow diagram of a second exemplary self-driving vehicle subroutine for dispatching self-driving vehicles of the exemplary system for loading and transporting parcels of FIG. 1.
Figure 7:
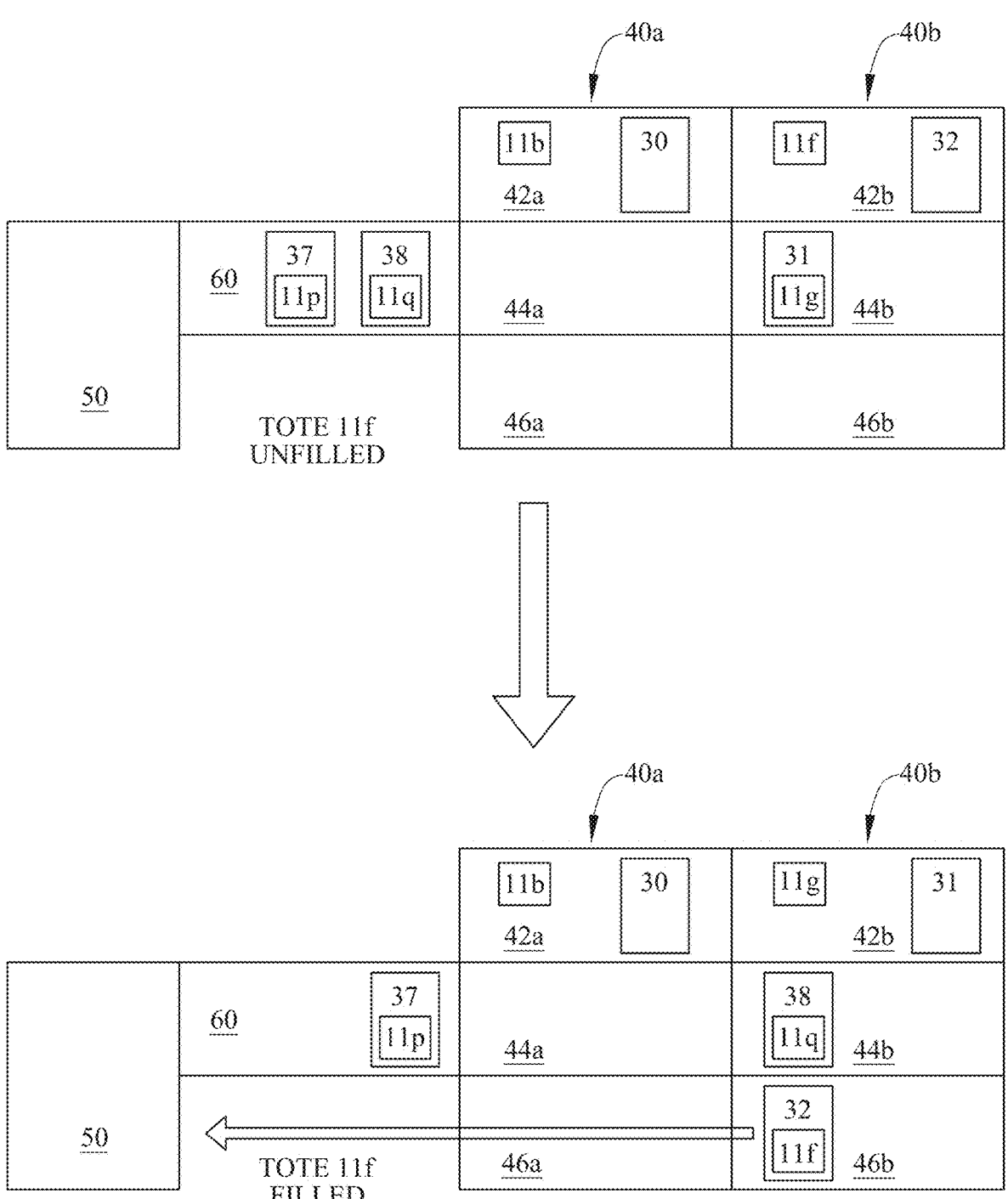
FIG. 7 is a schematic diagram showing an example of self-driving vehicles within the exemplary system for loading and transporting parcels of FIG. 1, with the self-driving vehicles moving in accordance with the second exemplary self-driving vehicle subroutine of FIG. 6.

Referring now to FIGS. 1-3, when the system 10 is in use, a tote for receiving parcels offloaded from the sorter 20 is provided downstream of each respective chute 22*a*, 22*b*, 22*c* of the sorter 20 (as indicated by totes 11*a*, 11*c*, 11*d*, 11*e*, 11*h*, 11*i*, 11*j*, 11*m* shown in FIG. 1). Once a tote is provided downstream of each respective chute 22*a*, 22*b*, 22*c*, SDVs are dispatched to assume an initial position within either a respective zone 40*a*, 40*b*, 40*c* of the loading area 40 (as indicated by SDVs 30, 31, 32, 33, 34 in FIG. 1), the unloading area 50, or the queue area 60 (as indicated by SDVs 35, 36, 37, 38 in FIG. 1) as indicated by block 102 in FIG. 3. Preferably, the SDVs are dispatched to their initial positions prior to parcels 25*a*, 25*b*, 25*c*, 25*d* being offloaded from the sorter or shortly after the commencement of parcels 25*a*, 25*b*, 25*c*, 25*d* being offloaded from the sorter 20. In this exemplary embodiment and implementation, the SDVs 31, 32, 33, 34, 35, 36, 37, 38 of the system 10 are dispatched by the controller 72 to an initial position, such that: (i) one SDV is provided along the first pathway 42*a*, 42*b*, 42*c* of each respective zone 40*a*, 40*b*, 40*c* of the loading area 40 (as indicated by SDVs 30, 32, 34 in FIG. 1); (ii) one SDV is provided along the second pathway 44*b*, 44*c* of each respective zone 40*b*, 40*c* of the loading area 40, except for the first zone 40*a* (as indicated by SDVs 31 and 33 in FIG. 1); and (iii) one or more SDVs are provided in the queue area 60 (as indicated by SDVs 35, 36, 37, 38 in FIG. 1). As shown in FIG. 1, in this exemplary embodiment and implementation, the number of SDVs not initially dispatched to the loading area (i.e., SDVs 35, 36, 37, 38 in FIG. 1) is equal to the number of positions available in the queue area 60. As such, in this exemplary embodiment and implementation, no SDVs are initially assigned to the unloading area 50. It should be appreciated however, that, in alternative embodiments and implementations where the number of SDVs not initially dispatched to the loading area 40 exceeds the number of the positions available within the queue area 60, such excess SDVs may be positioned in the unloading area 50 until space is available within the queue area 60, at which time the controller 72 will communicate instructions which cause select SDVs in the unloading area 50 to advance to the queue area 60 and the SDVs remaining in the unloading area 50 to advance in position closer to the queue area 60.

Each respective tote positioned downstream of a chute 22*a*, 22*b*, 22*c* of the sorter 20 can be characterized as a "loading tote" since it is positioned to receive parcels 25*a*, 25*b*, 25*c*, 25*d* offloaded from the sorter 20. The SDVs 31, 33 positioned along the second pathway 44*b*, 44*c* of a respective zone 40*b*, 40*c* of the loading area 40 and the SDVs 35, 36, 37, 38 positioned in the queue area 60 are provided with an empty tote, which also may be characterized as a "reserve tote," (as indicated by totes 11*g*, 11*l*, 11*m*, 11*n*, 11*o*, 11*p*, 11*q* in FIG. 1) for reasons which will become evident in the discussion that follows.

Referring now again to FIGS. 1-3, after the SDVs 30, 31, 32, 33, 34, 35, 36, 37, 38 are dispatched to their initial positions within either the loading area 40, the unloading area 50, or the queue area 60, the controller 72 selectively and iteratively dispatches select SDVs 30, 31, 32, 33, 34, 35, 36, 37, 38 between the loading area 40, the unloading area 50, and the queue area 60 in response to a loading tote being filled to a predetermined capacity and based on which zone 40*a*, 40*b*, 40*c* a select SDV 30, 31, 32, 33, 34, 35, 36, 37, 38 assigned to transport the filled loading tote is located, as further described below. Specifically, when the system 10 is in use, the controller 72 will typically selectively and iteratively dispatch select SDVs 30, 32, 33, 34, 35, 36, 37, 38 to travel either: (i) from the loading area 40 to the unloading area 50; (ii) from the unloading area 50 to the queue area 60; and (iii) from the queue area 60 to the loading area 40.

Referring still to FIGS. 1-3, prior to dispatching the SDVs 30, 31, 32, 33, 34, 35, 36, 37, 38 from their initial position, the controller 72 determines whether any of the loading totes are filled to the predetermined capacity, as indicated by decision 104 in FIG. 3. Accordingly, in this exemplary embodiment and implementation, the controller 72 determines whether any of the loading totes are filled to the predetermined capacity based on the readings obtained by the one or more sensors 80 of the control subsystem 70. As shown in FIG. 3, in instances where the readings obtained by the one or more sensors 80 and processed by the controller 72 are not indicative of any of the loading totes being filled to the predetermined capacity, the controller 72 will determine that none of the loading totes are filled and process new incoming readings obtained from the one or more sensors 80 until it is determined that a loading tote has been filled to the predetermined capacity.

Referring still to FIGS. 1-3, in this exemplary embodiment and implementation, upon determining that a loading tote has been filled to the predetermined capacity, the controller 72 subsequently determines which zone 40a, 40b, 40c in the loading area 40 the filled loading tote is located. Once a loading tote in a respective zone 40a, 40b, 40c is filled to a predetermined capacity, such tote may be characterized as a "filled tote." Specifically, in this exemplary embodiment and implementation, upon determining that a loading tote has been filled to a predetermined capacity, the controller 72 will determine whether the filled tote is positioned in the first zone 40a or the second zone 40b of the loading area, as indicated by decisions 106 and 108 in FIG. 3. Depending on which zone 40a, 40b, 40c the filled tote is determined to be located in, a particular SDV movement subroutine will be executed, as indicated by blocks 200, 300, 400 in FIG. 3.

Referring now to FIGS. 2-5, subsequent to the controller 72 determining that a filled tote is located in the first zone 40a of the loading area 40, the controller 72 will execute a first SDV movement subroutine 200. It should be appreciated that the specific SDV and tote reference numerals referred to in the following discussion of the first SDV movement subroutine 200 correspond to the example shown in FIG. 5. In this exemplary embodiment and implementation, the first SDV movement subroutine 200 commences by the controller 72 communicating instructions which cause the SDV 30 in the first pathway 42a of the first zone 40a of the loading area 40 to engage and transport the filled tote 11b to the unloading area 50, as indicated by block 202 in FIG. 4 and shown in FIG. 5. As the SDV 30 loaded with the filled tote 11b leaves the first pathway 42a of the first zone 40a, or subsequent to the SDV 30 loaded with the filled tote 11b exiting the first pathway 42a of the first zone 40a, the controller 72 communicates instructions which cause the SDV 38 in the first-in-line position (i.e., closest to the first zone 40a of the loading area) in the queue area 60 with a reserve tote 11q to travel to the first pathway 42a of the first zone 40a of the loading area 40 to replace the filled tote 11b with the reserve tote 11q (i.e., place the reserve tote 11q in the position previously occupied by the filled tote 11b) and then standby in the first pathway 42a of the first zone 40a, as indicated by block 204 in FIG. 4 and shown in FIG. 5. The SDV 38 providing the reserve tote 11q remains in the first pathway 42a on standby until the controller 72 determines another tote within the first zone 40a has been filled to the predetermined capacity, at which time the controller 72 will communicate instructions to have the SDV 38 on standby engage and transfer such tote to the unloading area 50. Subsequent to dispatching the SDV 38 with the reserve tote 11q to the first zone 40a of the loading area 40 from the first-in-line position in the queue area, the controller 72 communicates instructions which cause the SDVs remaining in the queue area 60 to advance in position (or index), so that a new SDV 37 with another reserve tote 11p is in the first-in-line position in the queue area 60, as indicated by block 206 in FIG. 4 and shown in FIG. 5.

Referring now to FIGS. 2, 3, 6, and 7, subsequent to the controller 72 determining that a filled tote is located in the second zone 40b of the loading area 40, the controller 72 will execute a second SDV movement subroutine 300. It should be appreciated that the specific SDV and tote reference numerals in the following discussion of the second SDV movement subroutine 300 correspond to the example shown in FIG. 7. In this exemplary embodiment and implementation, the second SDV movement subroutine 300 commences by the controller 72 communicating instructions which cause the SDV 32 in the first pathway 42b of the second zone 40b of the loading area 40 to engage and transport the filled tote 11f to the unloading area 50, as indicated by block 302 in FIG. 6 and shown in FIG. 7. As the SDV 32 loaded the filled tote 11f leaves the first pathway 42b of the second zone 40b, or subsequent to the SDV 32 loaded with the filled tote 11f exiting the first pathway 42b of the second zone 40b, the controller 72 communicates instructions which cause the SDV 31 in the second pathway 44b of the second zone 40b with reserve tote 11g to travel to the first pathway 42b of the second zone 40b of the loading area 40 to replace the filled tote 11f with the reserve tote 11g (i.e., place the reserve tote 11g in the position previously occupied by the filled tote 11f) and then standby in the first pathway 42b of the second zone 40b, as indicated by block 304 in FIG. 6 and shown in FIG. 7. The SDV 31 providing the reserve tote 11g remains in the first pathway 42b on standby until the controller 72 determines another tote within the second zone 40b has been filled to the predetermined capacity, at which time the controller 72 will communicate instructions to have the SDV 31 on standby engage and transfer such tote to the unloading area 50. Subsequent to dispatching the SDV 31 with the reserve tote 11g from the second pathway 44b to the first pathway 42b of the second zone 40b, the controller 72 communicates instructions which cause the SDV 38 in the first-in-line position in the queue area 60 with reserve tote 11q to travel to the second pathway 44b of the second zone 40b to occupy the position previously occupied by the SDV 31 carrying the reserve tote 11g used to replace the filled tote 11f, as indicated by block 306 in FIG. 6 and shown in FIG. 7. Subsequent to dispatching the SDV 38 with reserve tote 11q to the second pathway 44b of the second zone 40b, the controller 72 then communicates instruction which cause the SDVs remaining in the queue area 60 to advance in position, so that a new SDV 37 with another reserve tote 11p is in the first-in-line position in the queue area 60, as indicated by block 308 in FIG. 6 and shown in FIG. 7.

Referring now to FIGS. 2, 3, 8, and 9, as the loading area 40 only includes the first zone 40a, the second zone 40b, and the third zone 40c in this exemplary embodiment and implementation, in instances where a tote determined to be filled is not identified as being located in either the first zone 40a or the second zone 40b, the filled tote will, by default, be determined to be from the third zone 40c (i.e., the last zone), and the controller 72 will execute a third SDV movement subroutine 400. As noted, however, the number of zones within the loading area 40 can vary to better accommodate different sorting applications and/or environments. Accordingly, in instances where the loading area 40 includes more than three zones, the number of decision steps carried out by the controller 72 with respect to ascertaining which zone of the loading area a tote identified as being filled is located in (which in the present case corresponds to decisions 106 and 108 in FIG. 3) will generally be equal to $n-1$, where n is equal to the number of zones in the loading area 40. It should be appreciated that the specific SDV and tote reference numerals in the following discussion of the third SDV movement subroutine 400 correspond to the example shown in FIG. 9. In this exemplary embodiment and implementation, the third SDV movement subroutine 400 commences by the controller 72 communicating instructions which cause the SDV 34 in the first pathway 42c of the third zone 40c of the loading area 40 to engage and transport the filled tote 11k to the unloading area 50, as indicated by block 402 in FIG. 8 and shown in FIG. 9. As the SDV 34 loaded with the filled tote 11k leaves the first pathway 42c of the third zone 40c, or subsequent to the SDV 34 loaded with the filled tote 11k exiting the first pathway 42c of the third zone 40c, the controller 72 communicates instructions which cause the SDV 33 in the second pathway 44c of the third zone 40c with reserve tote 11l to travel to the first pathway 42c of the third zone 40c of the loading area 40 to replace the filled tote 11k with the reserve tote 11l (i.e., place the reserve tote 11l in the position previously occupied by the filled tote 11k) and then standby in the first pathway 42c of the third zone 40c, as indicated by block 404 in FIG. 8 and shown in FIG. 9. The SDV 33 providing the reserve tote 11l remains in the first pathway 42c on standby until the controller 72 determines another tote within the third zone 40c has been filled to the predetermined capacity, at which time the controller 72 will communicate instructions to have the SDV 33 engage and transfer such tote to the unloading area 50.

Figure 8:
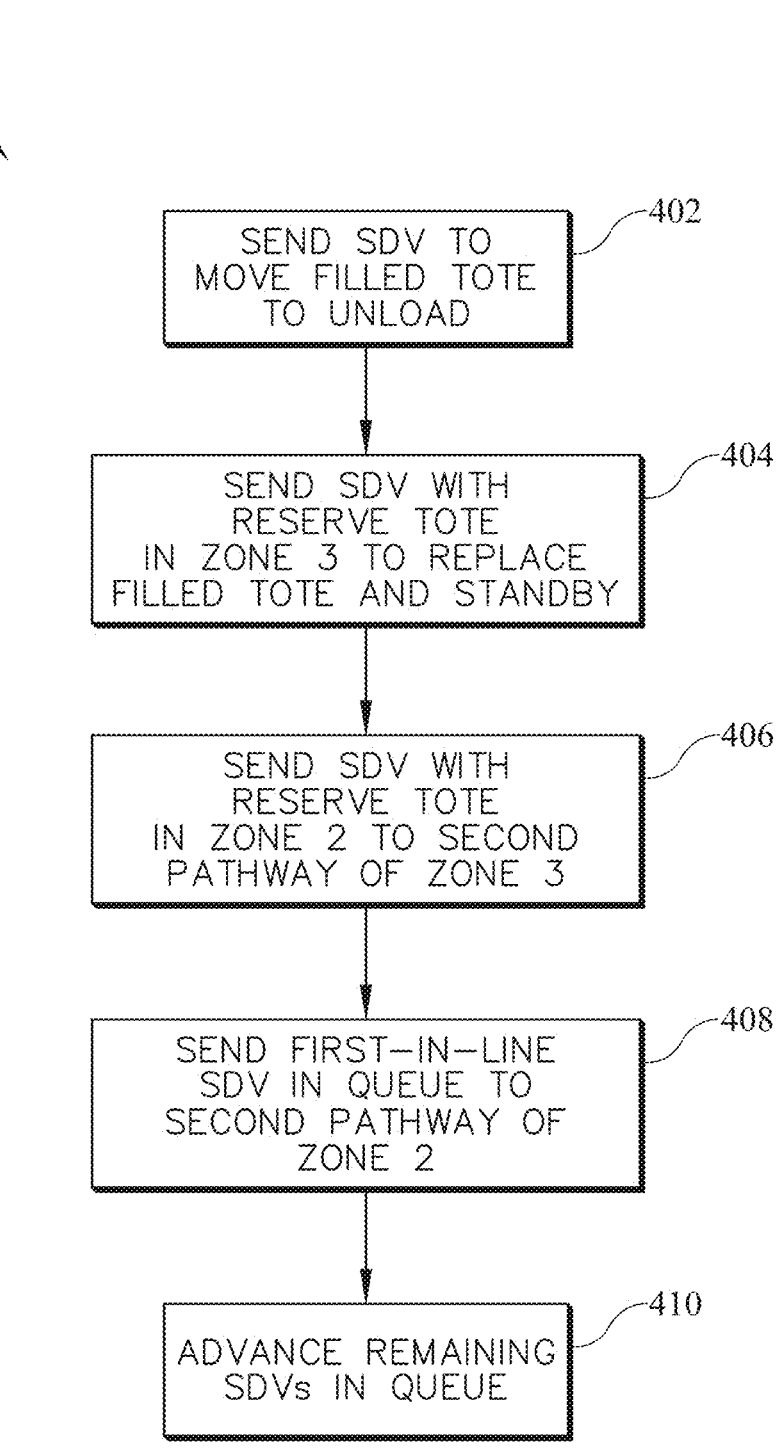
FIG. 8 is a flow diagram of a third exemplary self-driving vehicle subroutine for dispatching self-driving vehicles of the exemplary system for loading and transporting parcels of FIG. 1.
Figure 9:
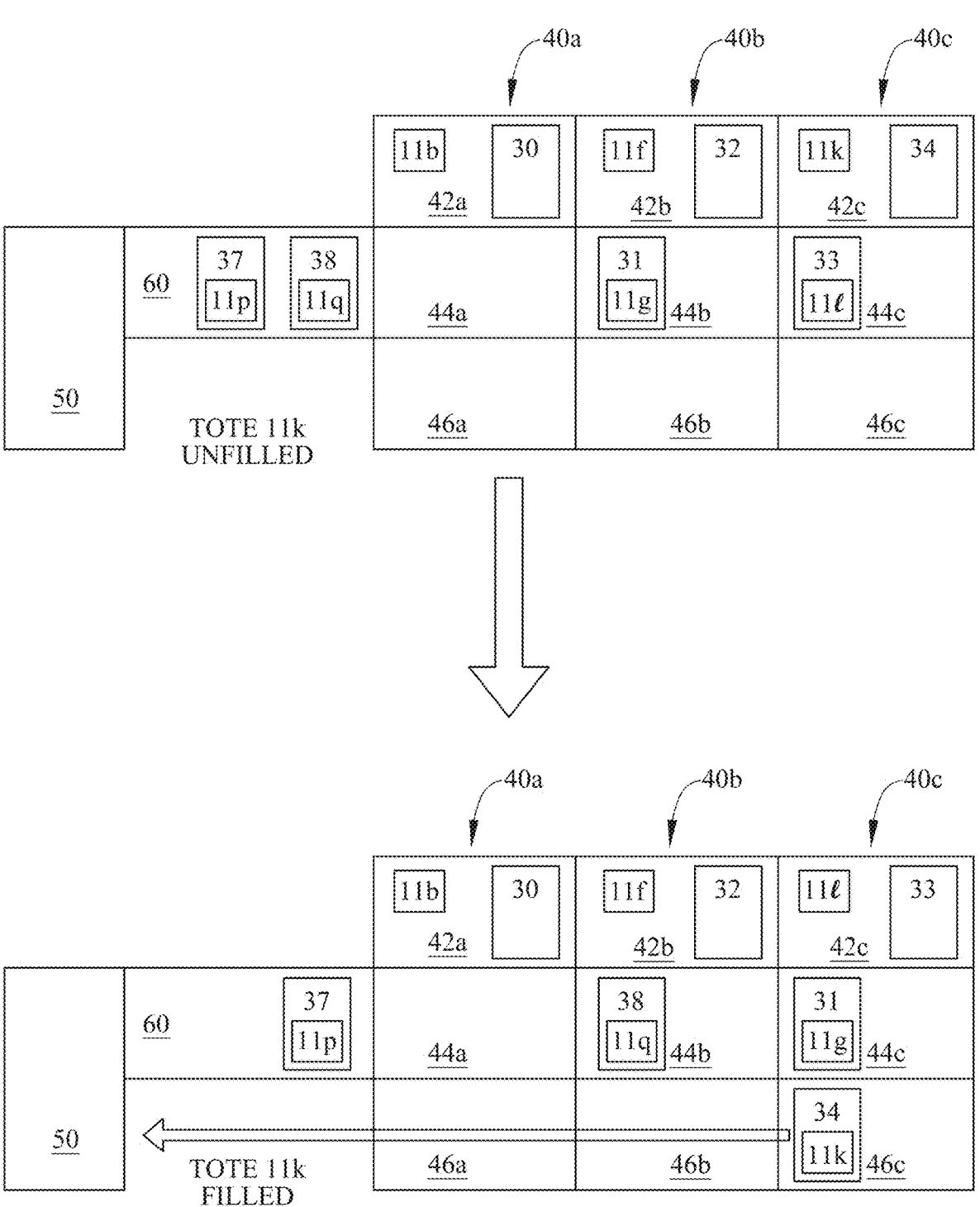
FIG. 9 is schematic diagram showing an example of self-driving vehicles within the exemplary system for loading and transporting parcels of FIG. 1, with the self-driving vehicles moving in accordance with the third exemplary self-driving vehicle subroutine of FIG. 8.

Referring still to FIGS. 2, 3, 8, and 9, subsequent to dispatching the SDV 33 with the reserve tote 11l from the second pathway 44c to the first pathway 42c of the third zone 40c in the third SDV movement subroutine 400, the controller 72 communicates instructions which cause the SDV 31 in the second pathway 44b of the second zone 40b with reserve tote 11g to travel to the second pathway 44c of the third zone 40c to occupy the position previously occupied by SDV 33 carrying the reserve tote 11l used to replace the filed tote 11k, as indicated by block 406 in FIG. 8 and shown in FIG. 9. Subsequent to dispatching SDV 31 to the second pathway 44c of the third zone 40c, the controller communicates instructions which cause the SDV 38 in the first-in-line position in the queue area 60 with reserve tote 11q to travel to the second pathway 44b of the second zone 40b to occupy the position previously occupied by the SDV 31 carrying the reserve tote 11g and dispatched to the second pathway 44c of the third zone 40c, as indicated by block 408 in FIG. 8 and shown in FIG. 9. Subsequent to dispatching the SDV 38 with reserve tote 11q and in the first-in-line position in the queue area 60, the controller 72 communicates instructions which cause the SDVs remaining in the queue area 60 to advance in position so that a new SDV 37 with another reserve tote 11p is in the first-in-line position in the queue area 60, as indicated by block 410 in FIG. 8 and shown in FIG. 9.

Referring now again to FIG. 1, in this exemplary embodiment and implementation, each respective SDV 30, 31, 32,

33, 34, 35, 36, 37, 38 in the system 10 includes a lift platform (not shown) on which the totes 11a, 11b, 11c, 11d, 11e, 11f, 11g, 11h, 11i, 11j, 11k, 11l, 11m, 11n, 11o, 11p, 11q can be placed, and which can be selectively raised to remove filled totes from the racks 12a, 12b, 12c and selectively lowered to deposit reserve totes onto the racks 12a, 12b, 12c.

A SDV loaded with a filled tote will typically move from the first pathway 42a, 42b, 42c of the zone 40a, 40b, 40c in which the tote was filled to the third pathway 46a, 46b, 46c of the zone 40a, 40b, 40c in which the tote was filled, and then proceed to travel along the third pathway 46a, 46b, 46c of any upstream zones 40a, 40b, 40c prior to reaching the unloading area 50. As shown in FIG. 1, in this exemplary embodiment, optical labels detectable by the SDVs 30, 31, 32, 33, 34, 35, 36, 37 38, extend from the third pathway 46a of the first zone 40a to the loading area 40, through the loading area 40 to the queue area 60, and from the queue area 60 to the second pathway 44a of the first zone 40a to assist the SDVs 30, 31, 32, 33, 34, 35, 36, 37, 38 in traveling between the loading area 40, the unloading area 50, and the queue area 60.

It should be appreciated that, in alternative embodiments and implementations in which the loading area 40 includes more than three zones, a similar subroutine as the third SDV movement subroutine 400 described above can be employed. That is, in instances where the loading area 40 includes three or more zones, as the reserve tote for one (donor) zone is moved to another, downstream (recipient) zone, the controller 72 will communicate instructions which cause a SDV to advance so that a new reserve tote is provided in the donor zone. For instance, in an alternative embodiment, the loading area 40 may include five zones. In such embodiment, upon a tote in the fifth zone (i.e., the zone furthest from the queue area 60) being identified as filled to the predetermined capacity based on the readings obtained by the one or more sensors 80, the controller 72 would first communicate instructions, which cause the SDV provided in the first pathway of the fifth zone to engage and transport the filled tote to the unloading area. The controller 72 would then communicate instructions which cause a SDV provided with a reserve tote and located in the second pathway of the fifth zone to travel to the first pathway of the fifth zone to replace the filled tote and then standby. The controller would then communicate instructions which cause a SDV with a reserve tote to be provided in the second pathway of each respective zone, except for the first zone. In this regard, the controller 72 would communicate instructions which cause: a SDV provided with a reserve tote and located in the second pathway of the fourth zone to travel to the second pathway of the fifth zone; a SDV provided with a reserve tote and located in the second pathway of the third zone to travel to the second pathway of the fourth zone; a SDV provided with a reserve tote and located in the second pathway of the second zone to travel to the second pathway of the third zone; and a SDV provided with a reserve tote and located in the first-in-line position in the queue area 60 to travel to the second pathway of the second zone. Upon the first-in-line position SDV exiting the queue area, the controller 72 would then communicate instructions which cause SDVs remaining in the queue area 60 to advance in position in the manner described above.

It should also be appreciated that the above discussion of the exemplary routine for dispatching SDVs shown in FIG. 3 will ordinarily be performed each time a tote within a zone becomes filled. Accordingly, in instances where totes provided in different zones 40a, 40b, 40c of the loading area 40 become filled close in time or at substantially the same time as each other, the controller 72 may execute multiple iterations of the exemplary routine of FIG. 3 in parallel. As such, depending on the time in which loading totes in two different zones become filled to the predetermined capacity, the first SDV movement subroutine 200, the second SDV movement subroutine 300, and/or the third SDV movement subroutine 400, or portions thereof, may be executed simultaneously. The controller 72 can iteratively execute the exemplary routine of FIG. 3 until all parcels 25*a*, 25*b*, 25*c*, 25*d* have been unloaded in the unloading area 50 or otherwise accounted by either the sorter 20 or operators thereof.

Accordingly, by iteratively executing the exemplary routine of FIG. 3, loading totes within each respective zone 40*a*, 40*b*, 40*c* of the loading area 40 filled to the predetermined capacity are expeditiously transported to the unloading area 50 by the SDVs 30, 31, 32, 33, 34, 35, 36, 37, 38, thereby reducing or eliminating the lag time associated with the manual transfer of containers filled with parcels 25*a*, 25*b*, 25*c*, 25*d* common in systems of known construction. Further, by swapping filled totes with reserve totes in the manner described above, parcels 25*a*, 25*b*, 25*c*, 25*d* can be continuously offloaded from the sorter 20 into each respective zone 40*a*, 40*b*, 40*c* of the loading area 40 with little to no downtime, thus improving the throughput of the system 10 as compared to systems of known construction.

Referring now again to FIG. 1, in the unloading area 50, the contents of a filled tote transported by a SDV 30, 31, 32, 33, 34, 35, 36, 37, 38 are emptied and/or disassociated from the SDV transporting the filled tote. As shown, in this exemplary embodiment and implementation, a first tote tipper 52 and a second tote tipper 54 are provided in or adjacent to the unloading area 50 and are utilized to empty the contents of the filled totes. Suitable tote flippers which may be utilized in the system 10 are described in commonly assigned U.S. patent application Ser. No. 18/592,801, the entire disclosure of which is incorporated herein by reference. The SDVs 30, 31, 32, 33, 34, 35, 36, 37, 38 can interact with the first tote flipper 52 and the second tote flipper 54 in the same manner as described in such reference. Once a filled tote is emptied, the SDV 30, 31, 32, 33, 34, 35, 36, 37, 38 loaded with the emptied tote is moved to the queue area 60 until being subsequently dispatched to one of the zones 40*a*, 40*b*, 40*c*. Once a filled tote is emptied, it effectively converts to a reserve tote. In this regard, subsequent to the contents of a filled tote being emptied, the controller 72 communicates instructions which cause the SDV 30, 31, 32, 33, 34, 35, 36, 37, 38 loaded with the emptied tote (i.e., the new reserve tote) to travel from the unloading area 50 to the queue area 60 or to another area for manual inspection prior to being subsequently dispatched to the queue area 60.

Referring now to FIGS. 1 and 2, in this exemplary embodiment and implementation, each tote flipper 52, 54 is operably connected to the controller 72 via a wired or wireless connection, such that, upon a filled tote being emptied by the tote flipper 52, 54 and placed back onto the SDV having delivered the tote, the tote flipper 52, 54 communicates a signal to the controller 72 indicating that the filled tote has been converted to a reserve tote and that the SDV is ready for dispatch to the queue area 60. Embodiments are also contemplated in which the one or more sensors 80 operably connected to the controller 72, in addition to obtaining readings indicative of when a tote is filled to the predetermined capacity, also obtain readings indicative of when a tote is emptied. For instance, in some embodiments, the one or more sensors 80 may include an additional camera (not shown) (i.e., in addition to the camera whose field of view encompasses the loading totes located in the loading area) positioned and configured to acquire images of totes in the unloading area 50 and/or a weight sensor associated with each tote and/or SDV. The readings obtained by the one or more sensors 80 indicative of the extent to which the totes are emptied are subsequently communicated to the controller 72 and processed thereby to determine when instructions to dispatch a SDV in the unloading area 50 to the queue area 60 should be communicated. In some embodiments, the readings from GPS chips associated with the SDVs may also be utilized by the controller 72 to determine when to dispatch SDVs from the unloading area 50 to the queue area 60.

It should be appreciated that each operation performed by the system 10 described herein can also be characterized as a method step, unless otherwise specified. Accordingly, in another aspect, the present disclosure is also directed to a method for automated parcel loading and transport, in which some or all of the various operations described above and performed by the system 10 correspond to a step within the method.

An exemplary method for loading and transporting parcels is described below with reference to certain features illustrated in FIGS. 1 and 2 for context. In the exemplary method, a plurality of totes are positioned to receive parcels offloaded from the sorter 20. In some implementations of the exemplary method, the plurality of totes may be initially positioned by an operator or by one or more of the SDVs 30, 31, 32, 33, 34, 35, 36, 37, 38. In the exemplary method, the controller 72 dispatches one or more SDVs carrying an empty tote to an initial position in the queue area 60 and a plurality of SDVs to an initial position in the loading area 40. Specifically, the controller 72 dispatches the plurality of SDVs 30 to the loading area, such that: (i) the first pathway 42*a*, 42*b*, 42*c* of each zone 40*a*, 40*b*, 40*c* in the loading area 40 is provided with a SDV 30, 32, 34; and (ii) the second pathway 44*b*, 44*c* of each zone 40*a*, 40*b*, 40*c*, except for the first zone 40*a* closest to the queue area 60, is provided with a SDV carrying an empty tote. Once the SDVs are so positioned, in the exemplary method, the controller 72 dispatches one or more select SDVs located in the first pathway 42*a*, 42*b*, 42*c* of a zone 40*a*, 40*b*, 40*c* of the loading area 40 (or one or more first select SDVs) to transport one or more select totes filled to a predetermined capacity with parcels 25*a*, 25*b*, 25*c*, 25*d* offloaded from the sorter 20. The controller 72 then, in the exemplary method, dispatches one or more select SDVs 31, 33, 38 located in the queue area 60 or the second pathway 44*b*, 44*c* of a zone 40*b*, 40*c* in the loading area 40 (or one or more second select SDVs) to: (i) deposit the empty totes carried thereby in a position previously occupied by the one or more select totes prior to being transported to the unloading area 50; and (ii) standby in the first pathway 42*a*, 42*b*, 42*c* previously occupied by the one or more first select SDVs.

In some implementations, the exemplary method for loading and transporting parcels may further include dispatching the one or more first select SDVs from the unloading area 50 to the queue area 60 subsequent to the one or more select totes being emptied. In some implementations, dispatching the one or more second select SDVs may include dispatching a first SDV in the queue area 60 to the loading area 40. In some implementations, the exemplary method may further include advancing a second SDV in the queue area 60 to the first-in-line position in the queue area 60 previously occupied by the first SDV in the queue area 60 prior to being dispatched to the loading area 40. In some implementations, the first SDV 38 in the queue area 60 may be dispatched to the position occupied by the one of the one or more first selected self-driving vehicles prior to transporting a select tote of the one or more select totes to the unloading area 50. In some implementations, dispatching the one or more second select SDVs may include dispatching one of the one or more second select SDVs located in the loading area 40 to the position occupied by one of the one or more first select SDVs prior to transporting one of the select totes filled to the predetermined capacity to the unloading area 50. In some implementations, the exemplary method may include dispatching a SDV in the first-in-line position in the queue area 60 to the position occupied by the one of the one or more second select SDVs prior to being dispatched to the position occupied by the one of the one or more first select-driving vehicles. In some implementations, dispatching the one or more second select SDVs may include dispatching one of the one or more second select SDVs located in the loading area 40 to the position occupied by one of the one or more first select SDVs prior to transporting one of the select totes filled to the predetermined capacity to the unloading area 50. In some implementations, dispatching the one or more second select SDVs may include dispatching a third select self-driving vehicle located in the loading area 40 to a position occupied by the one of the one or more second select SDVs prior to the one of the one or more second select SDVs being dispatched to the position occupied by the one of the one or more first selected self-driving vehicles.

It should be appreciated that each method steps described herein can also be characterized as an operation performed by the system 10.

One of ordinary skill in the art will recognize that additional embodiments and implementations are also possible without departing from the teachings of the present disclosure. This detailed description, and particularly the specific details of the exemplary embodiments and implementations disclosed herein, are given primarily for clarity of understanding, and no unnecessary limitations are to be understood therefrom, for modifications will become obvious to those skilled in the art upon reading this disclosure and may be made without departing from the spirit or scope of the disclosure.

What is claimed is:

1. A method for loading and transporting parcels in a sorting facility including a loading area with a plurality of zones into which parcels offload from a sorter are directed, an unloading area, and a queue area, the method comprising steps of:

(a) positioning a plurality of totes to receive parcels offloaded from the sorter;

(b) dispatching, by a controller including one or more processors, one or more self-driving vehicles to an initial position in the queue area, with each self-driving vehicle of the one or more self-driving vehicles dispatched to the queue area carrying an empty tote;

(c) dispatching, by the controller, a plurality of self-driving vehicles to an initial position in the loading area, such that (i) a first pathway of each zone of the plurality of zones is provided with one of the plurality of self-driving vehicles dispatched to the loading area, the first pathway of each zone being adjacent to one or more of the plurality of totes, and (ii) a second pathway of each zone of the plurality of zones, except for the zone positioned closest to the queue area, is provided with another one of the plurality of self-driving vehicles of the plurality of self-driving vehicles dispatched to the loading area, with each of the another one of the plurality of self-driving vehicles carrying an empty tote;

(d) dispatching, by the controller, a first self-driving vehicle located in the first pathway of a first zone of the plurality of zones to transport a first of the plurality of totes, which is filled to a predetermined capacity, to the unloading area; and (e) dispatching, by the controller, a second self-driving vehicle located in the queue area or the second pathway of the first zone to (i) deposit a second tote, which is empty, in a position previously occupied by the first tote, and (ii) standby, after depositing the second tote, in the first pathway of the first zone.

2. The method as recited in claim 1, and further comprising a step of:

dispatching, by the controller, the first self-driving vehicle from the unloading area to the queue area subsequent to the first tote being emptied.

3. The method as recited in claim 1, and further comprising a step of:

dispatching, by the controller, one self-driving vehicle located in the queue area to advance to a first-in-line position in the queue area subsequent to another self-driving vehicle being dispatched, by the controller, from the first-in-line position in the queue area to the loading area.

4. The method as recited in claim 3, wherein the step of dispatching the second self-driving vehicle includes dispatching the second self-driving vehicle to travel from the first-in-line position in the queue area to the first pathway of the first zone.

5. The method as recited in claim 4, wherein the step of dispatching the second self-driving vehicle includes dispatching the second self-driving vehicle to travel from the second pathway of the first zone to the first pathway of the first zone.

6. The method as recited in claim 5, and further comprising a step of:

dispatching, by the controller, a third self-driving vehicle to travel from the first-in-line position in the queue area to the second pathway of the first zone.

7. The method as recited in claim 5, and further comprising a step of:

dispatching, by the controller, a third self-driving vehicle to travel from a second pathway of a second zone positioned adjacent to the first zone to travel from the second pathway of the second zone to the second pathway of the first zone.

8. The method as recited in claim 1, wherein the first pathway and the second pathway of each zone of the plurality of zones is provided with one or more indicators detectable by the one or more self-driving vehicles dispatched to the initial position in the queue area and the plurality of self-driving vehicles dispatched to the initial position in the loading area.

* * * * *